(12) United States Patent
Lindsay

(10) Patent No.: US 8,407,909 B2
(45) Date of Patent: Apr. 2, 2013

(54) TAPE MEASURE CARRIER AND GAUGE

(76) Inventor: James Scullion Lindsay, Kelowna (CA)

( * ) Notice: Subject to any disclaimer, the term of this patent is extended or adjusted under 35 U.S.C. 154(b) by 0 days.

(21) Appl. No.: 12/923,133

(22) Filed: Sep. 3, 2010

(65) Prior Publication Data

US 2012/0055038 A1    Mar. 8, 2012

(51) Int. Cl.
*G01B 3/10* (2006.01)
(52) U.S. Cl. ............... 33/770; 33/755; 33/760
(58) Field of Classification Search ............ 33/770, 33/755, 759, 760, 766
See application file for complete search history.

(56) References Cited

U.S. PATENT DOCUMENTS

| | | | | |
|---|---|---|---|---|
| 1,259,886 A * | 3/1918 | McLeod | | 33/760 |
| 2,065,143 A * | 12/1936 | Metcalf | | 33/27.032 |
| 2,549,503 A | 4/1951 | McCully | | |
| 3,063,157 A | 11/1962 | Keene | | |
| 3,336,678 A | 8/1967 | Chamberlin et al. | | |
| 4,200,984 A * | 5/1980 | Fink | | 33/427 |
| 4,890,393 A | 1/1990 | St. Jean | | |
| 5,020,235 A | 6/1991 | Martin | | |
| 5,390,426 A * | 2/1995 | Hull | | 33/770 |
| 5,406,711 A | 4/1995 | Graham | | |
| 5,782,007 A * | 7/1998 | Harris | | 33/768 |
| 6,158,139 A | 12/2000 | Bond | | |
| 6,178,655 B1 | 1/2001 | Potter et al. | | |
| 6,434,854 B1 | 8/2002 | MacColl et al. | | |
| 6,497,050 B1 | 12/2002 | Ricalde | | |
| 6,598,311 B2 | 7/2003 | Noon | | |
| 6,892,469 B2 * | 5/2005 | Tufts et al. | | 33/768 |
| 7,020,978 B1 * | 4/2006 | Nelson | | 33/760 |
| 7,062,859 B1 * | 6/2006 | Revnell | | 33/32.1 |
| 7,219,440 B2 * | 5/2007 | Lewis et al. | | 33/760 |
| 7,484,313 B1 * | 2/2009 | Ogilvie | | 33/770 |
| 7,584,548 B2 | 9/2009 | Nielson | | |
| 7,676,950 B2 * | 3/2010 | Ogilvie | | 33/770 |

FOREIGN PATENT DOCUMENTS

CA    2587368    7/2008

* cited by examiner

*Primary Examiner* — Christopher Fulton

(57) ABSTRACT

A tape measure carrier for use in taking internal measurements includes a side wall and a base extending from the sidewall. The sidewall is of sufficient thickness so a tape measure chip will snugly slide down over the top of the sidewall to seat the tape measure on or close to the base. A base shelf is formed at the forward end of the base. A clear window piece is mounted to the base or sidewall so as to extend spaced over and parallel to the base shelf to form a channel therebetween. The channel is located and sized to allow free horizontal passage of the tape measure tape through the channel. A cross hair on the window piece is positioned to provide a known pre-determined distance between the cross hair and the rearmost end of the carrier.

4 Claims, 17 Drawing Sheets

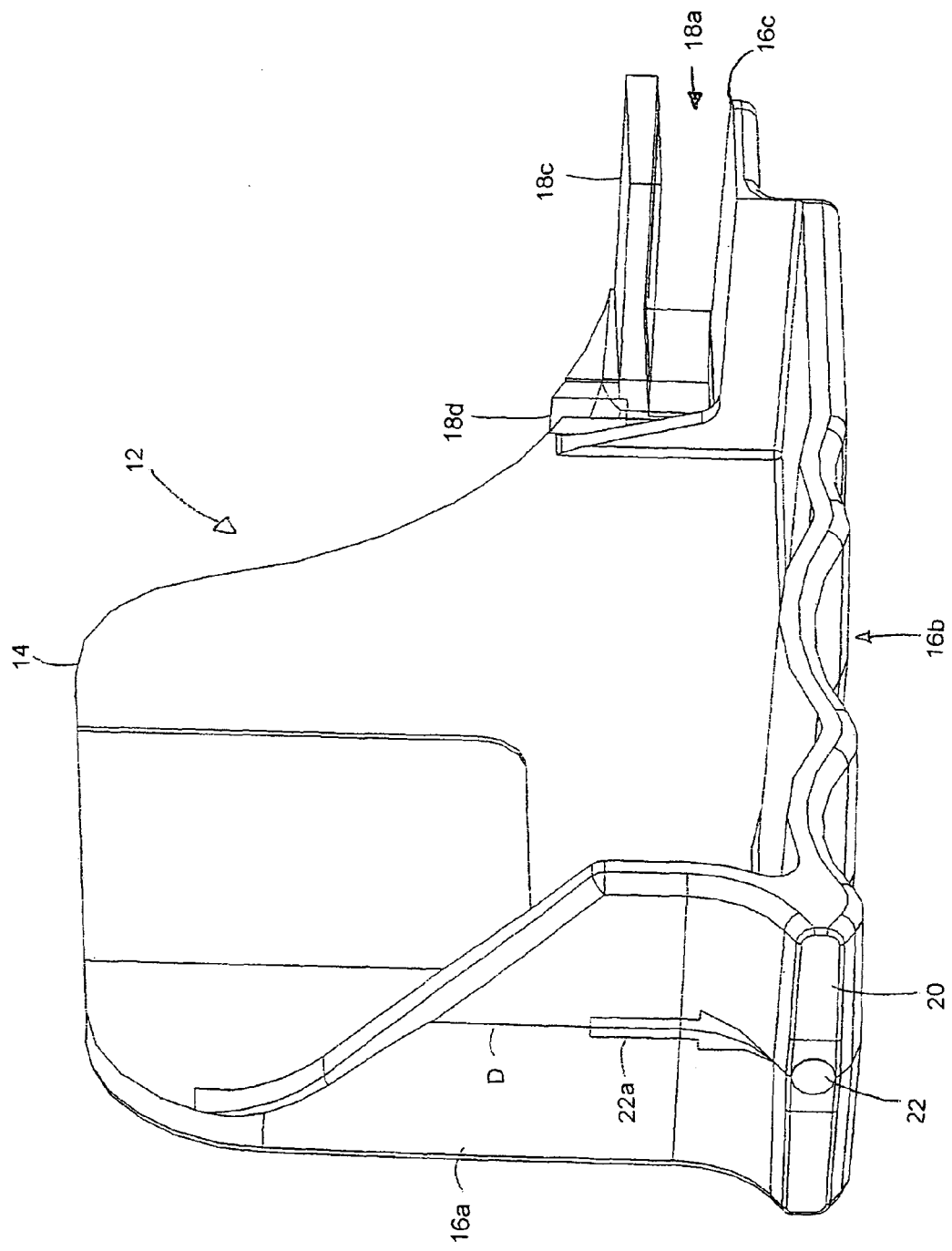

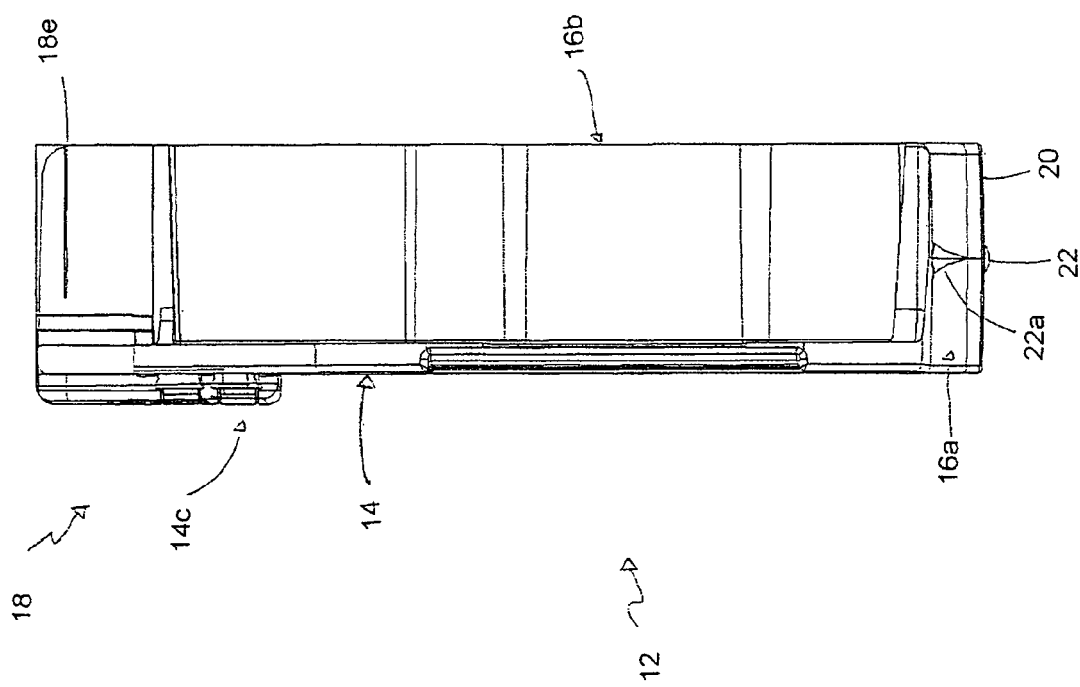

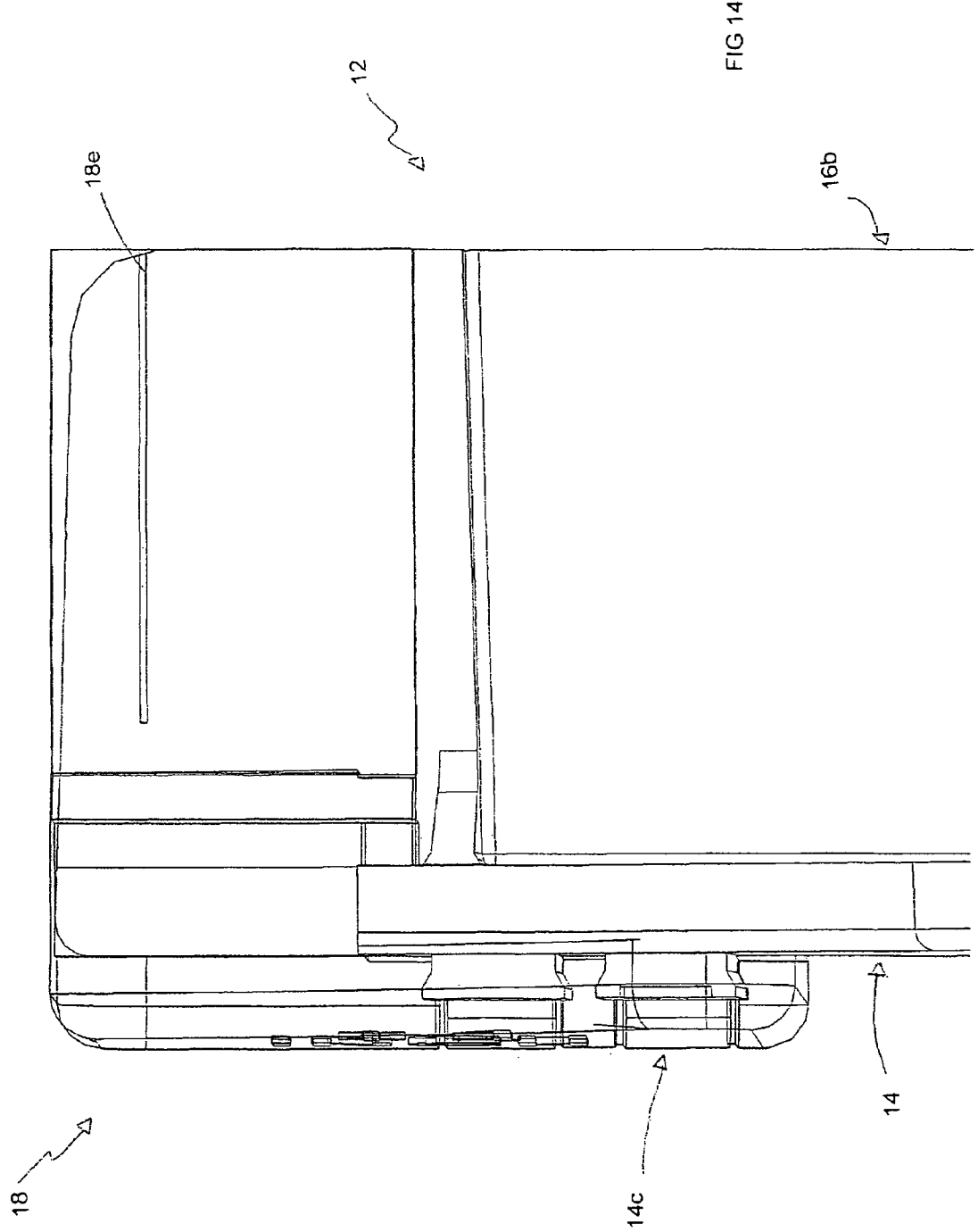

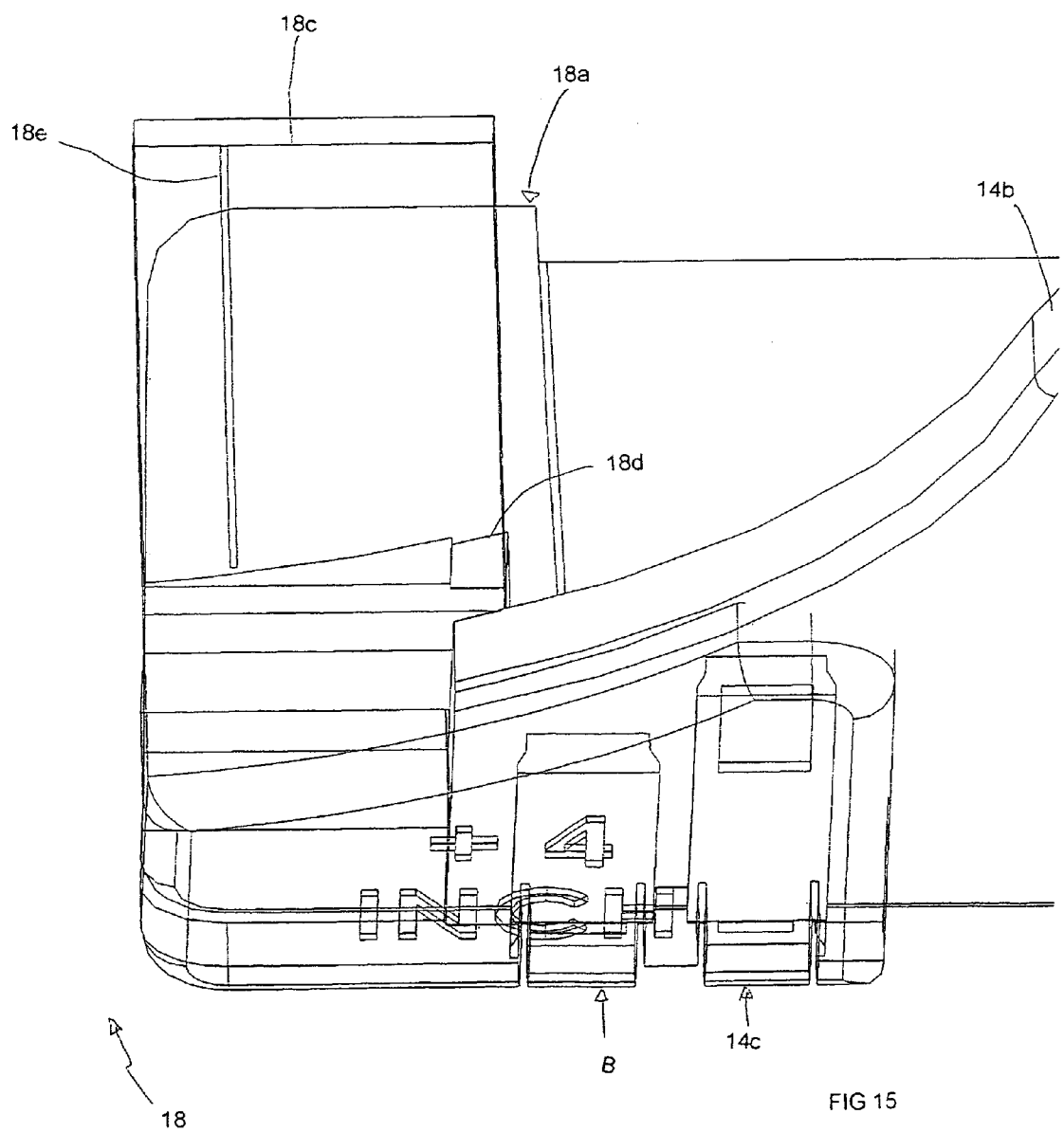

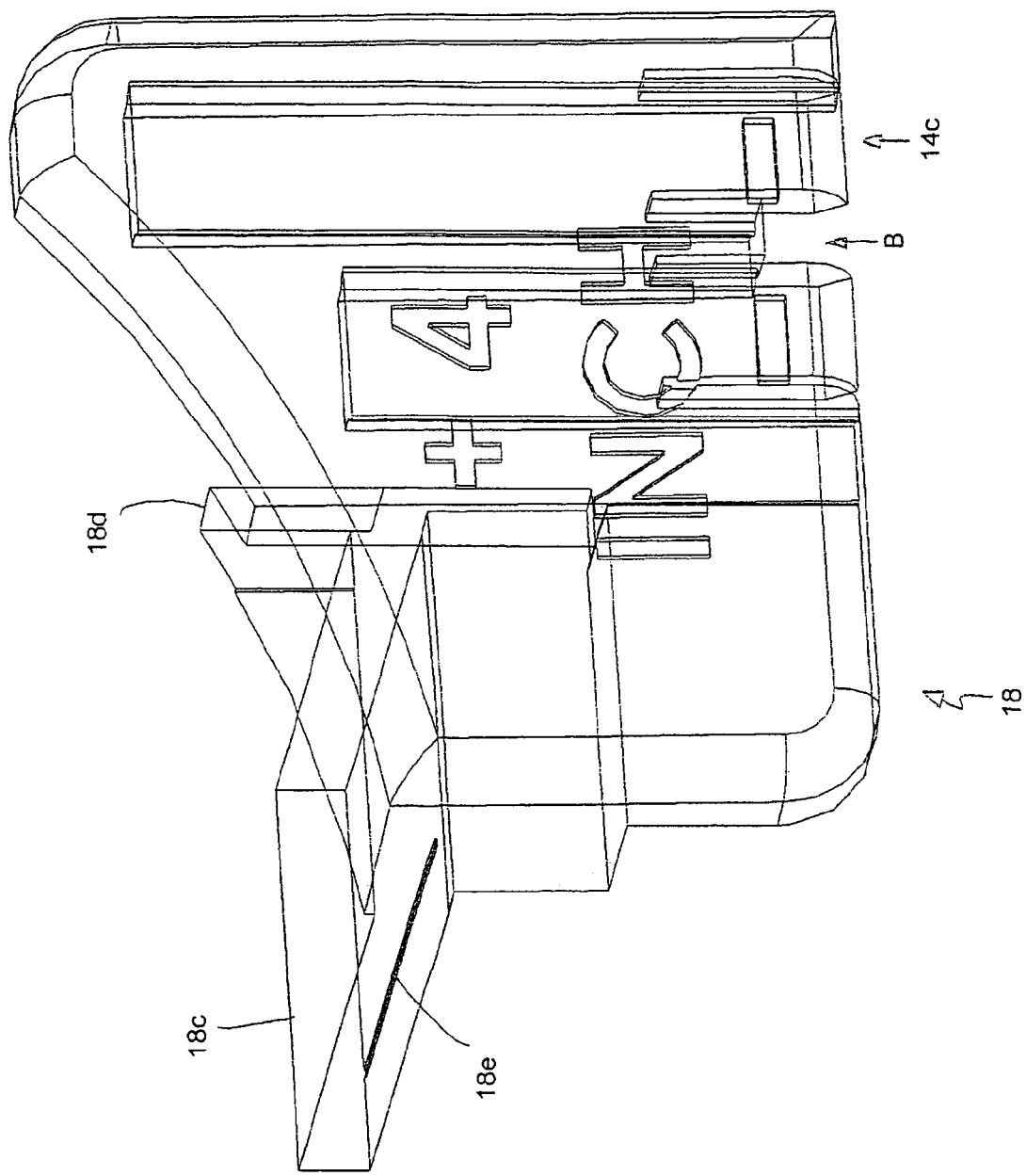

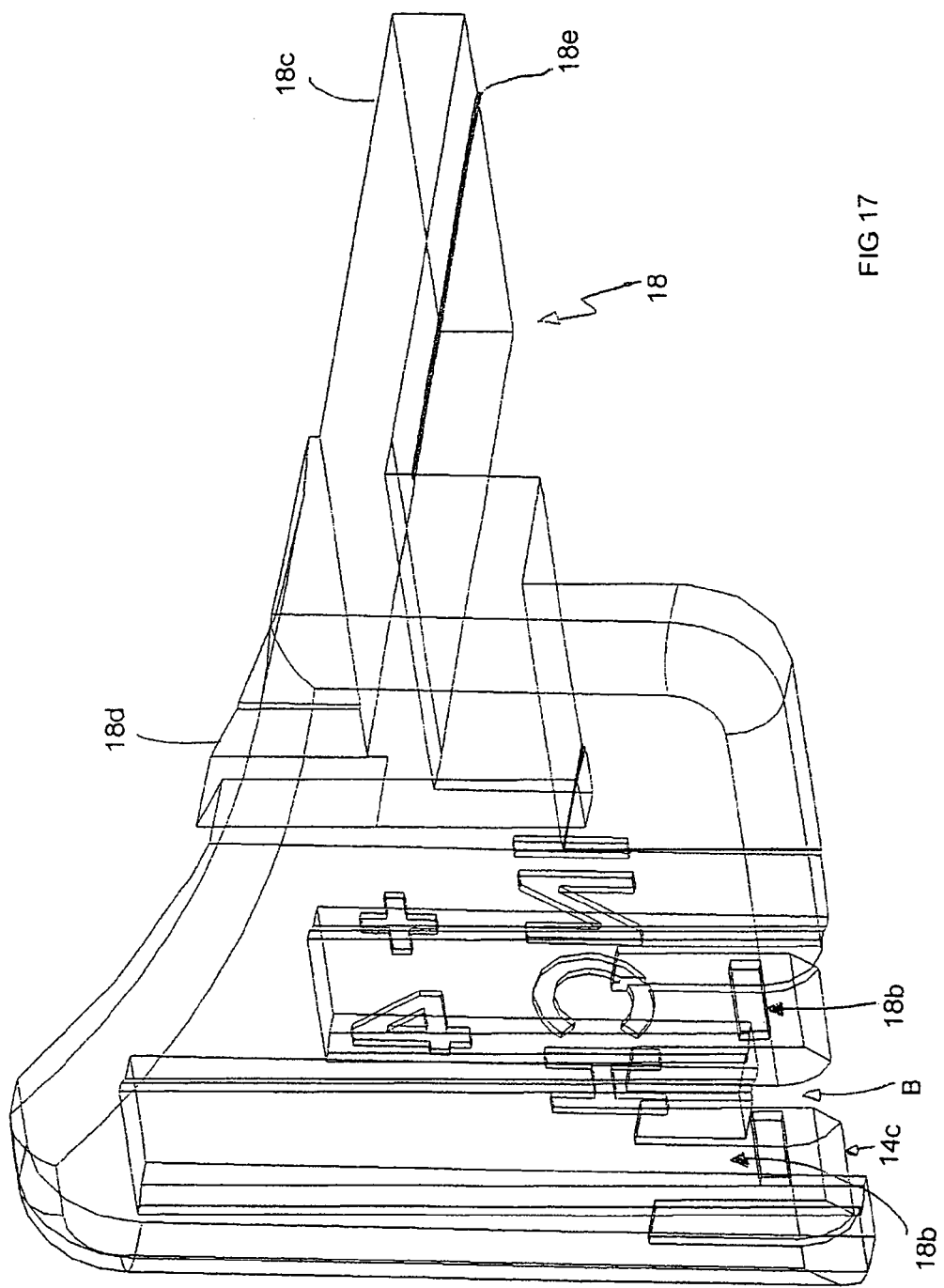

TAPE MEASURE CARRIER AND GAUGE

FIELD OF THE INVENTION

This invention relates to the field of tape measures which provide increased accuracy in taking internal measurements by the providing of a discreet measurement distance which is added to the measurement indicated on the tape which has been extended from the tape measure housing, and in particular, to a tape measure carrier which accomplishes the result of providing for internal measurements of improved accuracy using a tape measure carrier which may be used with conventional tape measures of different sizes.

BACKGROUND OF THE INVENTION

In the prior art, applicant is aware of U.S. Pat. No. 2,549,503 which issued to McCully on Apr. 17, 1951 for a Rule Attachment, McCully provides a support for the case of a metal coil measuring tape capable of supporting the case in an upright position and capable of being readily attached thereto or detached therefrom. In particular, McCully discloses an attachment which has a frame with a bottom supporting surface having a relatively great surface area wherein the frame projects both longitudinally and laterally from the case and where the tape when withdrawn from the case lies along the top surface of the case support. Means are provided to secure the tape immovably in any position to which it is withdrawn from the case. In a preferred embodiment, McCully teaches that the case support includes a centrally disposed tongue insertable into the case, under the metal measuring tape where it is frictionally held against accidental removal.

Applicant is also aware of U.S. Pat. No. 3,063,157 which issued Nov. 13, 1962 to Keene for a Marker for Measuring Tape, Keene discloses a marking attachment adapted for releasable connection to a housing which encloses a tape supporting reel and steel measuring tape thereon. Keene provides a marker structure which is adapted to be engaged with the housing of the flexible reeled tape, and which is readily disengaged from the housing wherein the marking structure includes an open-top generally rectangular casing whose opposite side and end walls are frictionally engageable with the corresponding walls of the housing and with the bottom wall of the housing resting on the bottom wall of the casing. The casing is provided in one end thereof with a tape guiding passage. The casing is also provided with a marker in vertical alignment with the guide passage whereby a measurement may be marked by the marker through the action of the same hand which supports the housing.

Applicant is also aware of U.S. Pat. No. 3,336,678 which issued Aug. 22, 1967 to Chamberlain et al for a Marking Attachment for Coiled Measuring Tape, Chamberlain et al discloses an elongated rigid body having transversely extending front and rear arms and a thumb screw for attaching the device on a tape casing. A vertically disposed marking element is mounted in forwardly extending upper and lower yoke arms adjacent to the edge of the measuring tape. A pointer is formed on each of the upper and lower yoke arms in transverse alignment with the marking element for indicating the distance at which the measuring tape extends beyond the marking element.

Applicant is also aware of U.S. Pat. No. 6,158,139 which issued Dec. 12, 2000 to Bond for a Mechanical Measuring Tape Device and Square, Bond discloses a retaining adaptor which may be removably mounted to the housing of a mechanical measuring tape, the retaining adaptor having a drop hook and a drag hook, either of which may be attached to the object or construction piece being measured. The retaining adaptor permits a worker to use the conventional mechanical measuring tape beyond his or her natural reach. A rule may be provided along the side of the retaining adaptor.

Applicant is also aware of U.S. Pat. No. 6,178,655 which issued Jan. 30, 2001 to Potter et al for a Marking Attachment for Measuring system, Potter teaches a marking element attached to a support where the support may be attached to a tape measure. The marker is resiliently maintained spaced apart from the surface to be marked until the support is moved towards the surface to contact the surface with the marker. A cursor may be provided to indicate where a mark is to be made.

Applicant is also aware of U.S. Pat. No. 6,598,311 which issued Jul. 29, 2003 to Noon for a Tape Measure and Accessories, Noon discloses providing a tape measure case having a builders square along one side wall and having a magnifying lens to magnify the numbers and markings on the measuring tape.

Applicant is also aware of U.S. Pat. No. 7,584,548 which issued Sep. 8, 2009 to Nielson for a Tape Measure, Nielson teaches providing a magnifying lens connected to a tape measure housing. The magnifying lens overlays the portion of the measuring tape which extends outside the housing. The magnifying lens extends laterally beyond one of the longitudinal edges of the measuring tape. The magnifying lens is provided with a cross hair which extends across the lens perpendicularly to the longitudinal edges of the measuring tape. A pair of elongate members extend from the housing oppositely to the measuring tape so as to allow the tape measure to be used to measure internal dimensions when the pair of elongate members are in an extended position extending in line with the bottom of the tape measure housing. Nielson teaches that to take an internal measurement, the free end of the elongate members is abutted against the start point of the internal measurement, the magnifying lens is moved to overlay the measuring tape extending from the housing, and the measuring tape extended so that the free ends of the measuring tape are at the opposite end of the internal measurement. The user then sums the value of the measuring tape indicia aligned with the cross hair on the magnifying lens with a known value which is equal to the distance between the cross hair and the free end of the pair of elongate members.

SUMMARY OF THE INVENTION

In summary, the tape measure carrier according to the present invention for supporting a coiled metal tape style of tape measure, may in one aspect be described as including a semi-enclosed housing and a lens piece.

The semi-enclosed housing includes:
(a) a substantially planar side wall having a thickness which is sufficient for fitting into, and frictionally engaging within, the spring clip if the tape measure, wherein the side wall has a front end, an opposite rear end and opposite upper and lower edges,
(b) a base flange joined along one edge thereof to, and extending orthogonally from, the lower edge of the side wall, wherein the base flange extends from adjacent the front end to adjacent the rear end of the sidewall,
(c) a rear wall connected to at least one of the rear end of the side wall or the base flange, the rear wall extending substantially orthogonally from both the sidewall and the base flange, and wherein a heel is formed in a corner between the base flange and the rear wall,
(d) a shelf connected to at least one of the front end of the sidewall or the base flange, the shelf and extending substantially orthogonally from the sidewall, and wherein the shelf is substantially horizontal, The lens piece has a clear lens, that is, a substantially optically transparent lens, herein also intended to include collectively a lens or window piece which is either entirely clear or clear through only a restricted portal. The lens piece includes a mounting base. The mounting base is adapted to be releasably mounted to the front end of the sidewall. The lens is mounted cantilevered from the mounting base so as to be disposed in substantially parallel spaced-apart array over the shelf when the lens piece is mounted on the front end of the sidewall. The lens has a cross-hair formed along the lens so as to extend along the lens orthogonally from the sidewall.

As stated above, the thickness of the sidewall is sufficient for the tape measure clip to mount on the sidewall of the tape measure carrier to frictionally engage over and down along the sidewall as the tape measure is translated downwardly to releasably matingly engage the clip onto the sidewall. The semi-enclosed housing is sized so that the tape measure at least partially fills the semi-enclosed housing when mated by clipping thereon, without the tape measure having to necessarily seat against the rear wall, but preferably so that it sits on the base flange, so long as the tape can freely pass through the channel between the lens and the shelf, whereby a variety of sizes of conventional tape measures may be accommodated within the tape measure carrier.

In one embodiment the mounting base of lens piece is adapted to releasably mount downwardly onto an exterior surface of the front end of the sidewall, that is, onto the surface which is oppositely disposed on the sidewall relative to the base flange.

A predetermined known distance is formed from the rear stop to the cross-hair, whereby a measured distance measured along the tape measure tape between the cross-hair and the lens and the distal end of the tape is summed with the known distance to provide a total measurement from the rear stop to the distal end of the tape. Advantageously the lens piece includes an externally viewable indication of the numerical value (for example expressed in inches or in millimetres) of the known distance marked on the exterior of the lens piece so a user knows for example whether it is to be used with metric measurements or with conventional United States conventional or Imperial measurements in inches. Thus the lens piece may include a plurality of interchangeable lens pieces, for example to include an "inches" known distance lens piece and a metric known distance lens piece. On the "inches" known distance lens piece the known distance is an integer number of inches, that is, are expressed in non-fractional numbers. Thus the cross-hair is positioned on the lens, and the lens positioned on the mounting bases to provide the whole number integer of inches from the rear stop to the cross-hair. On the metric known distance lens piece the known distance is an integer number of metric length measurement units such as expressed in millimetres or centimetres. Thus the cross-hair is positioned on the lens, and the lens positioned on the mounting base, to provide the integer number of metric length measurement units from the rear stop to the cross-hair.

BRIEF DESCRIPTION OF THE DRAWINGS

Wherein like reference numerals denote corresponding parts in each view:

FIG. 12 is, in left rear perspective view, the tape measure carrier of FIG. 6.

FIG. 13 is, in plan view, the tape measure carrier of FIG. 6.

FIG. 14 is an enlarged view of the front end of the tape measure carrier of FIG. 13.

FIG. 15 is, in right upper perspective view, the front end of the tape measure carrier of FIG. 6.

FIG. 16 is, in right front perspective view, the lens piece of the tape measure carrier of FIG. 15.

FIG. 17 is, in left rear perspective view, the lens piece of FIG. 16.

DETAILED DESCRIPTION OF EMBODIMENTS OF THE INVENTION

Figure 1:
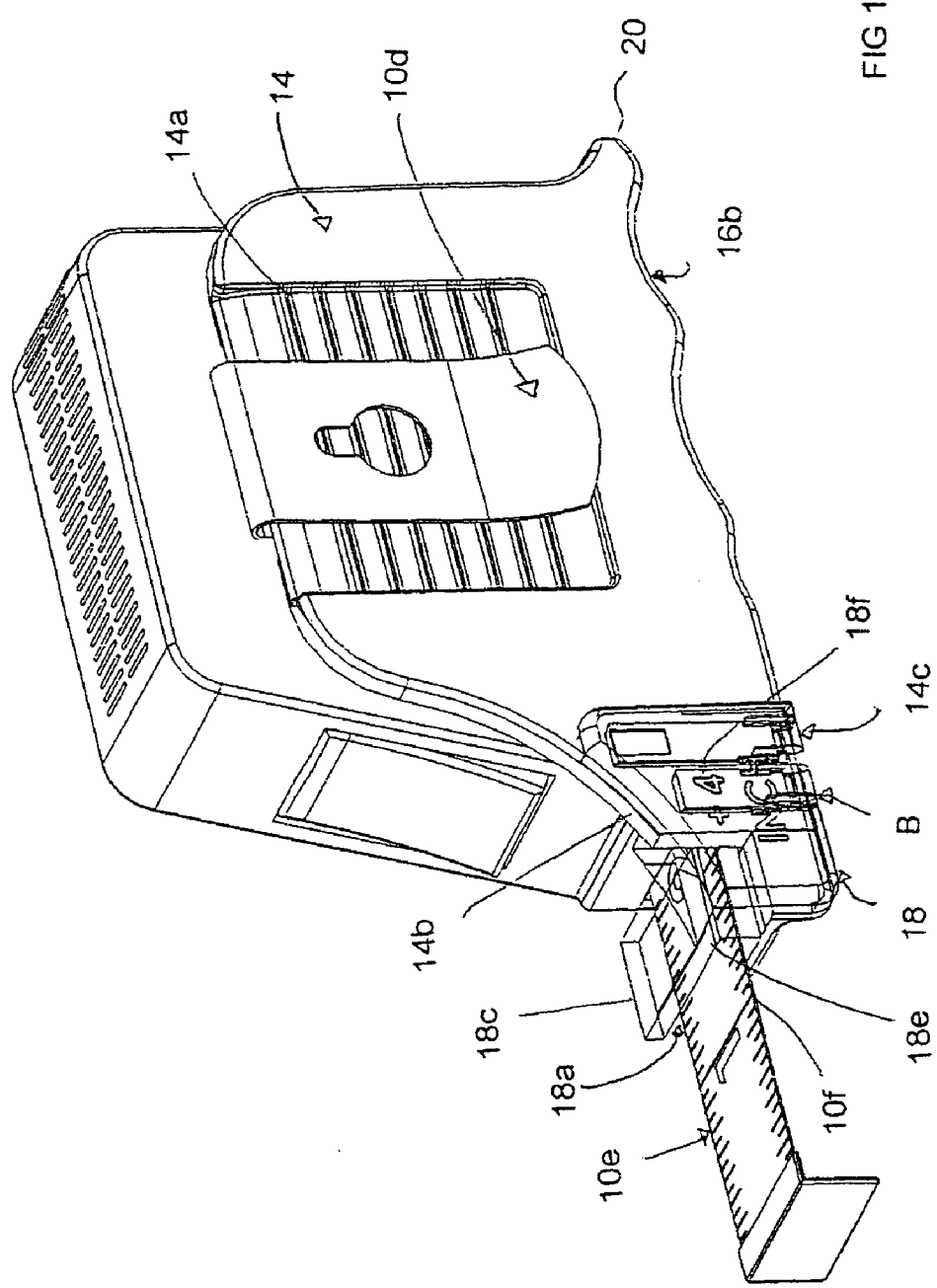
FIG. 1 is, in right side perspective view, a conventional tape measure mounted onto the tape measure carrier according to the present invention.
Figure 2:
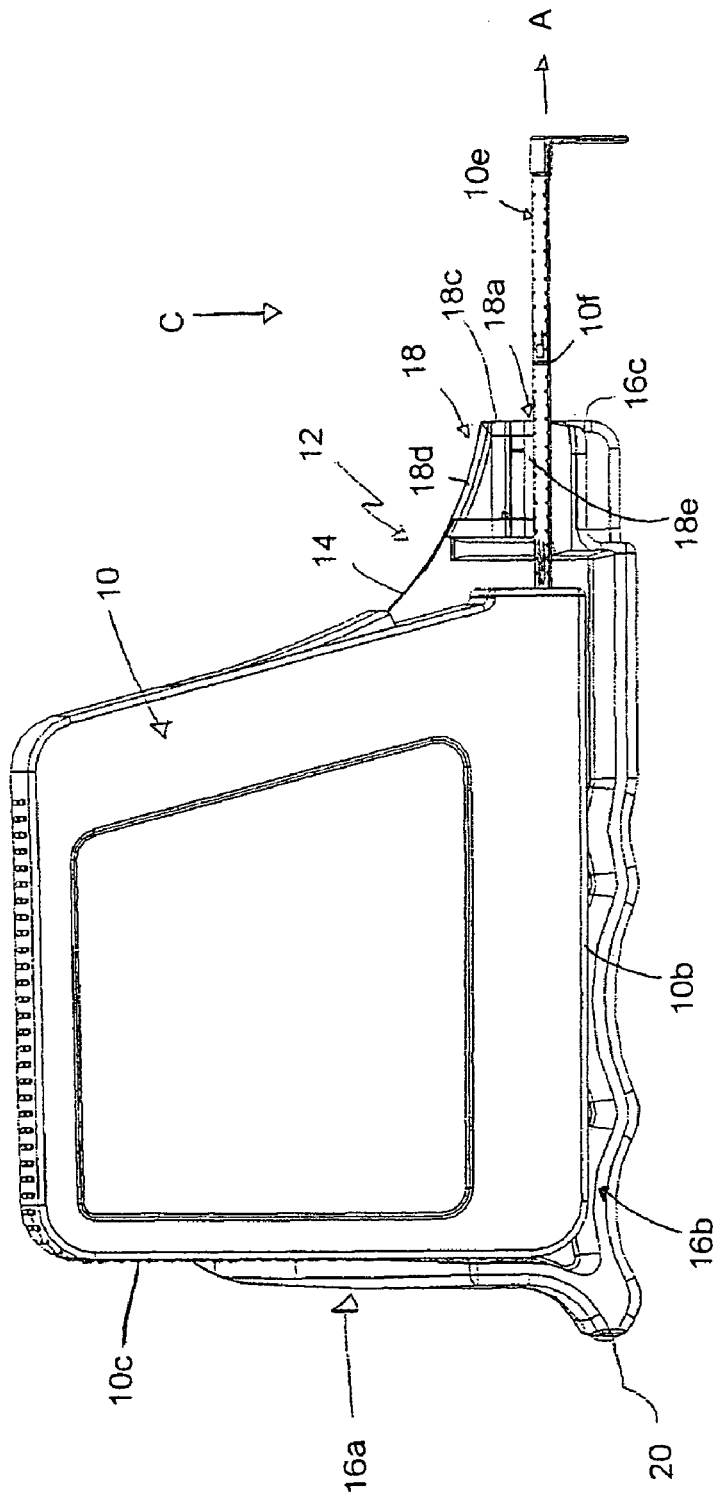
FIG. 2 is, in left side elevation view, the tape measure and tape measure carrier of FIG. 1.
Figure 3:
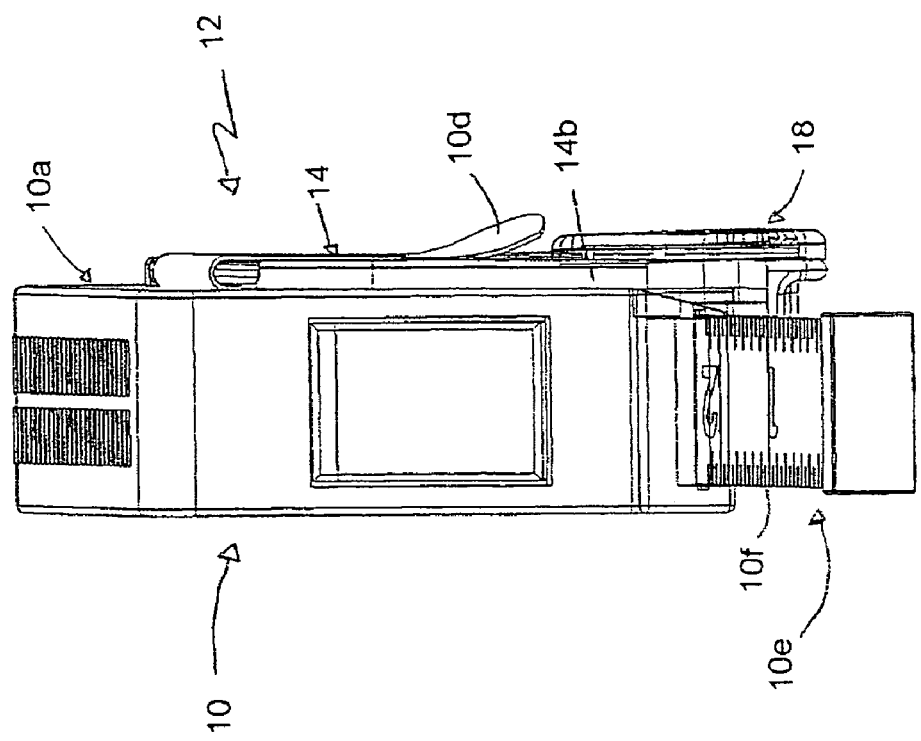
FIG. 3 is, in front top perspective view, the tape measure and tape measure carrier of FIG. 1.
Figure 4:
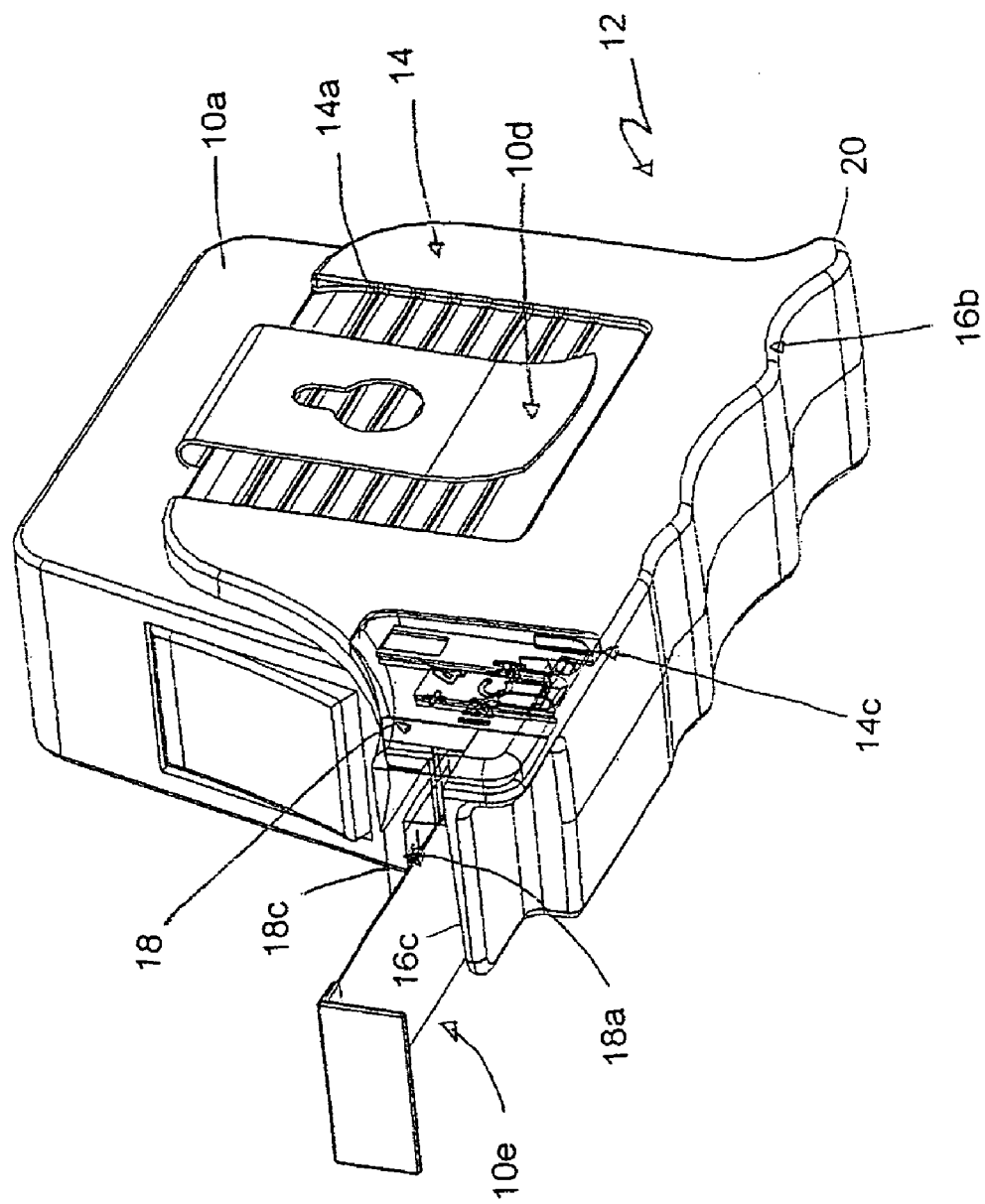
FIG. 4 is, in front right side bottom perspective view, the tape measure and tape measure carrier of FIG. 1.
Figure 5:
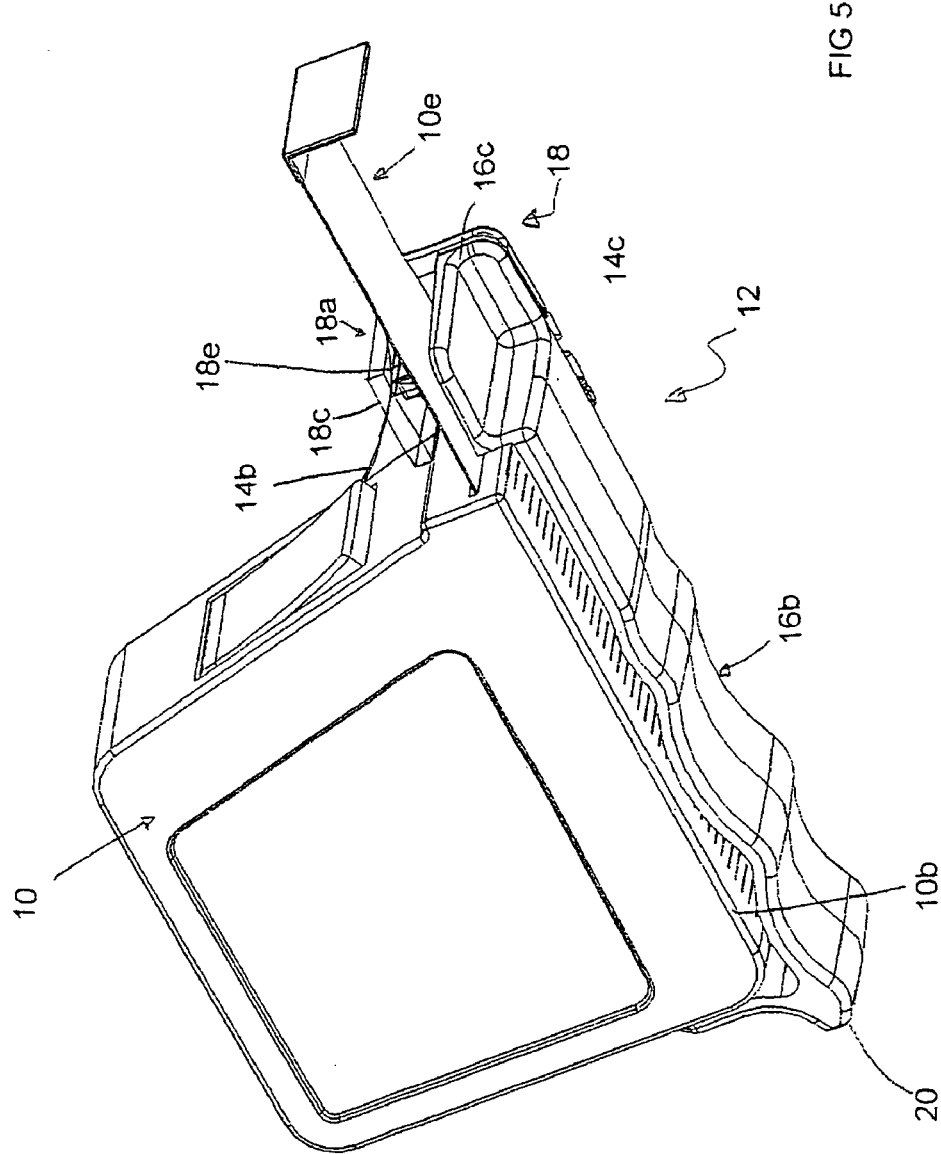
FIG. 5 is, in left side front bottom perspective view, the tape measure and tape measure carrier of FIG. 1.
Figure 6:
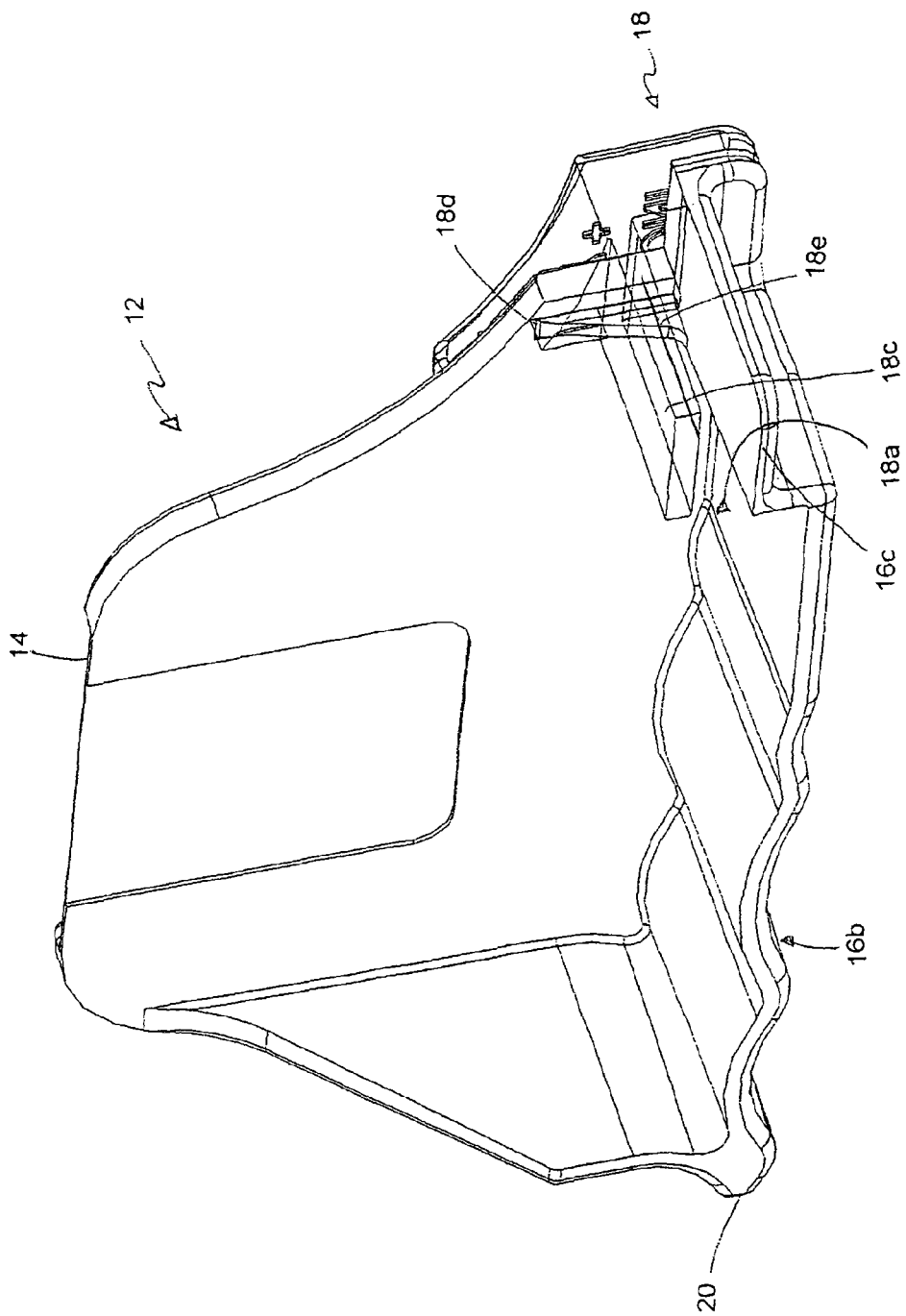
FIG. 6 is, in left side perspective view the tape measure carrier according to one embodiment of the present invention.
Figure 7:
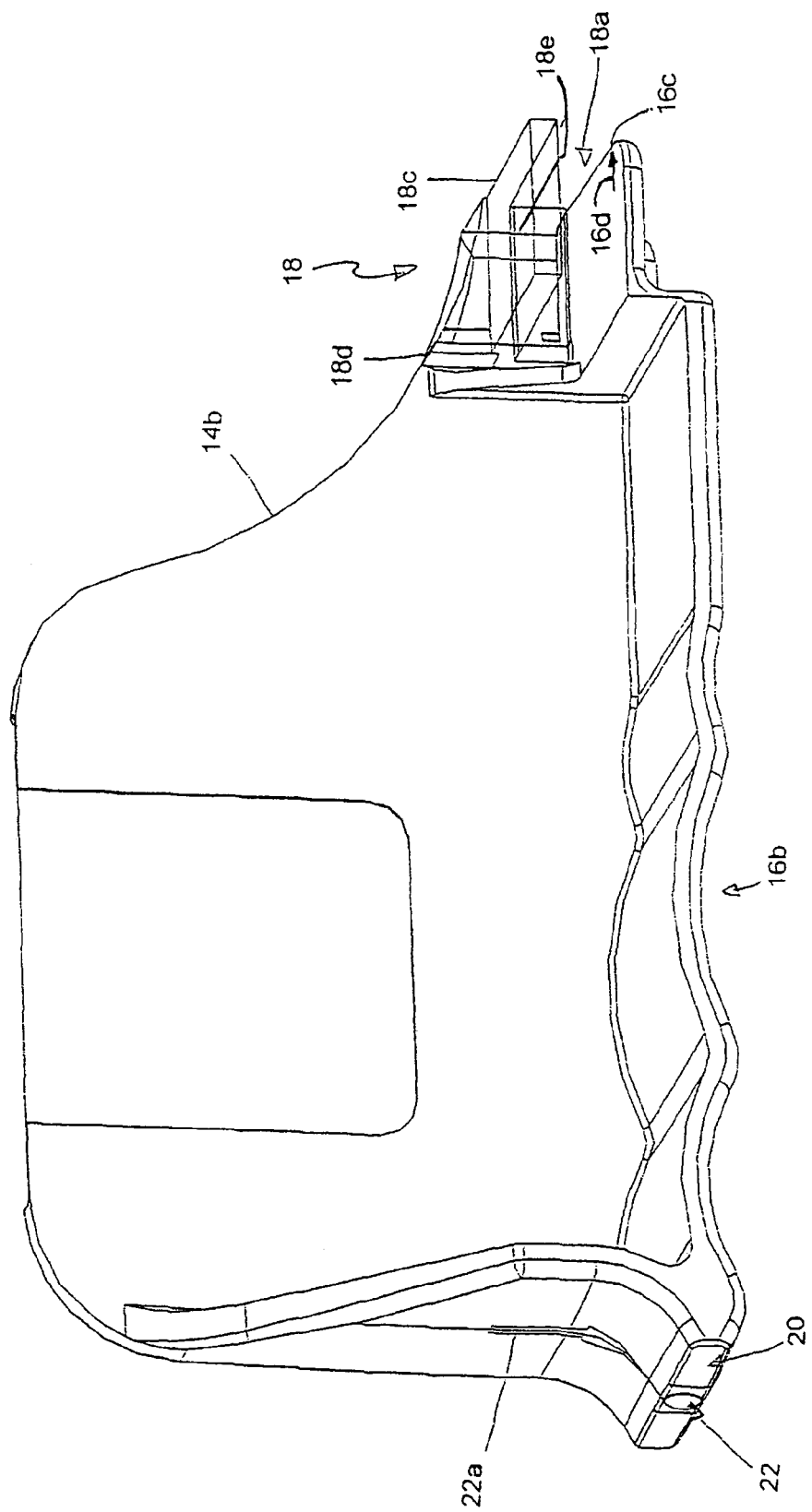
FIG. 7 is, in left rear perspective view, the tape measure carrier of FIG. 6.
Figure 8:
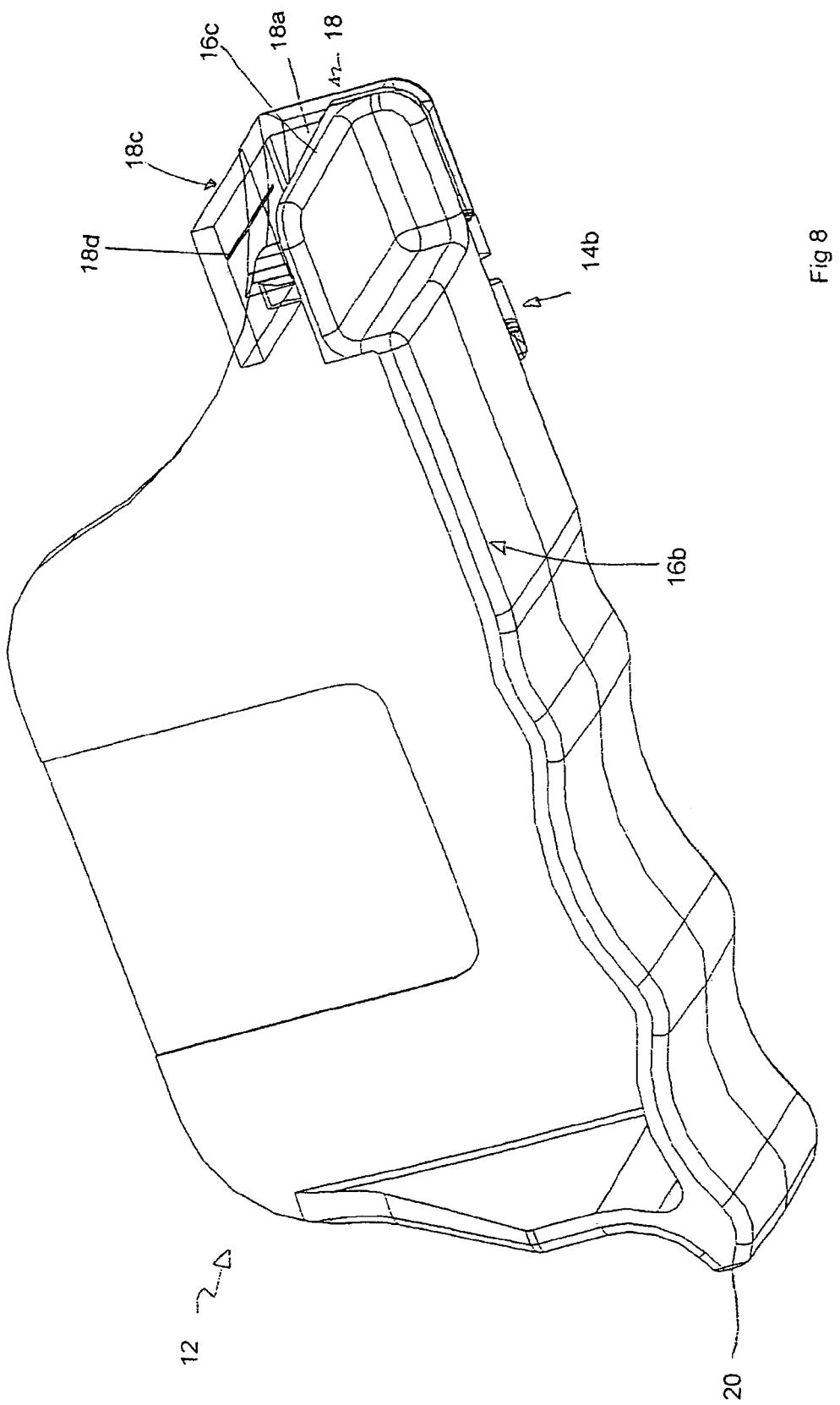
FIG. 8 is, in left bottom perspective view, the tape measure carrier of FIG. 6.
Figure 9:
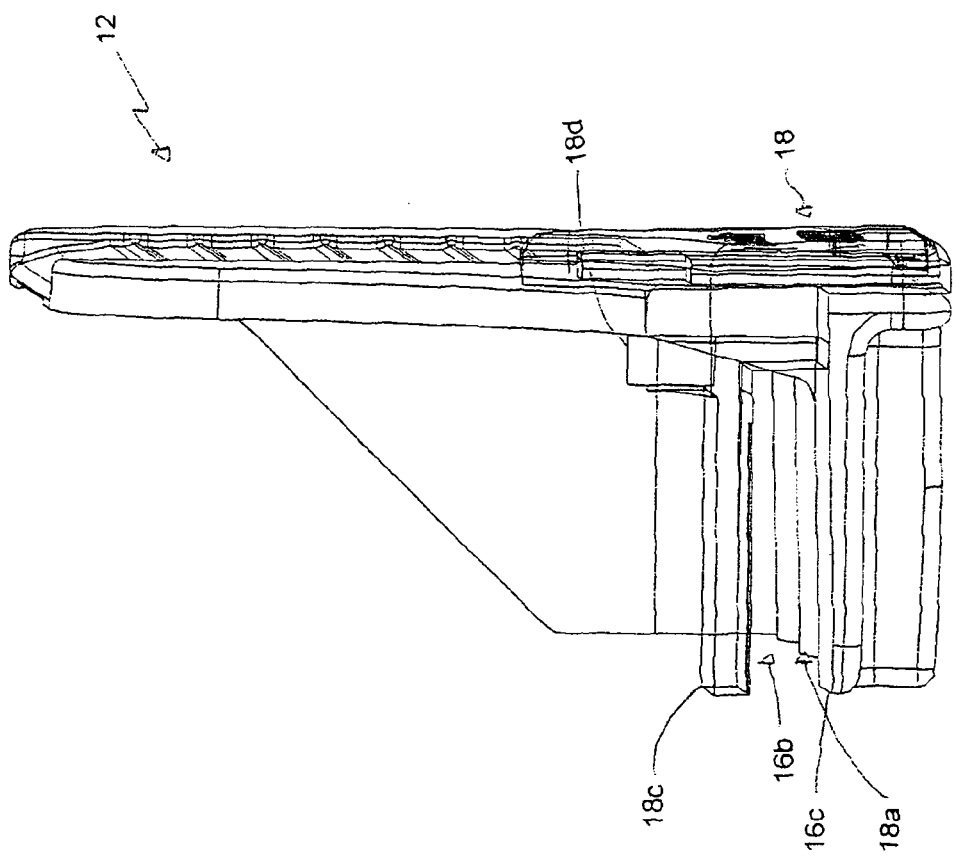
FIG. 9 is, in upper front perspective view, the tape measure carrier of FIG. 6.
Figure 10:
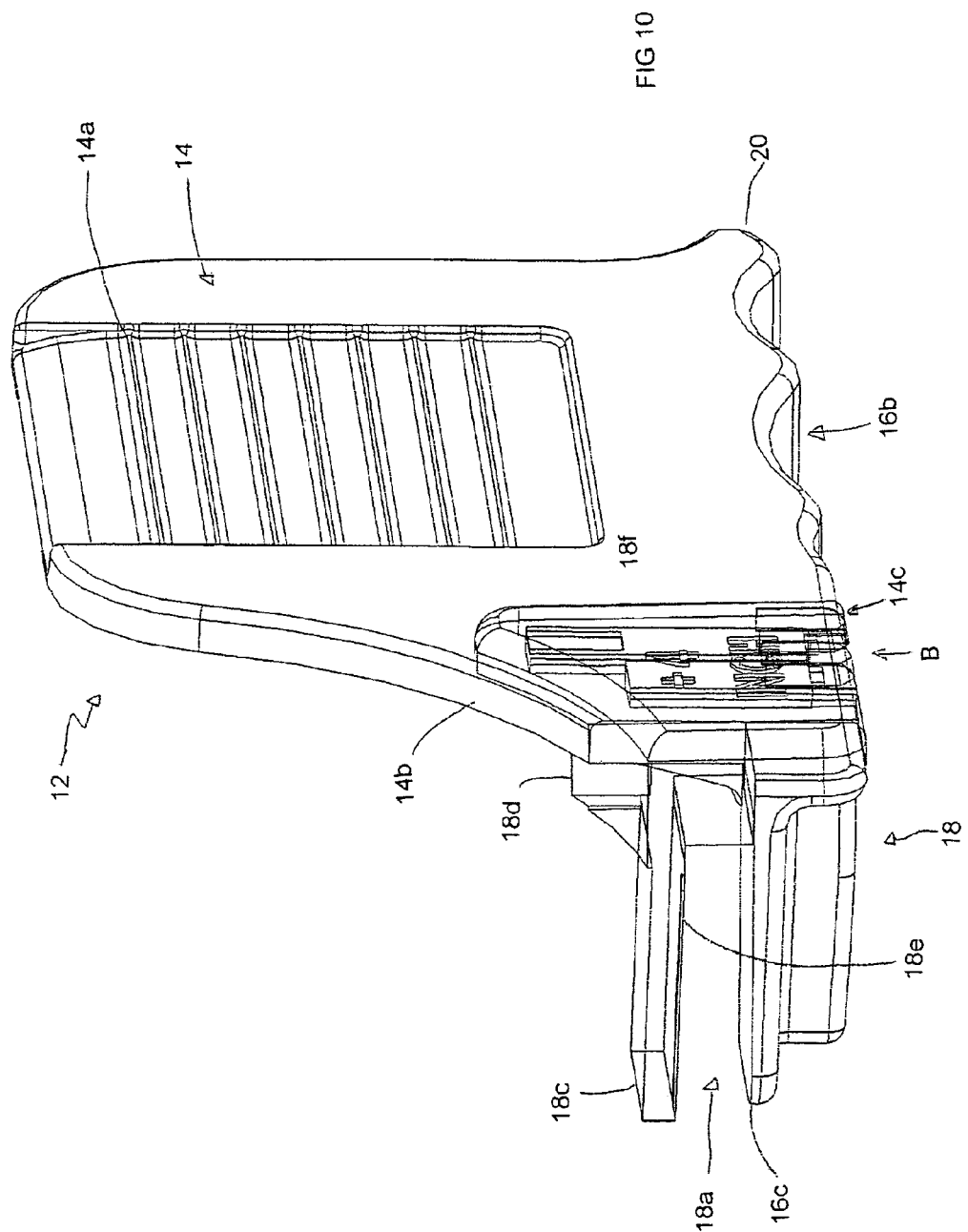
FIG. 10 is, in right front perspective view, the tape measure carrier of FIG. 6.
Figure 11:
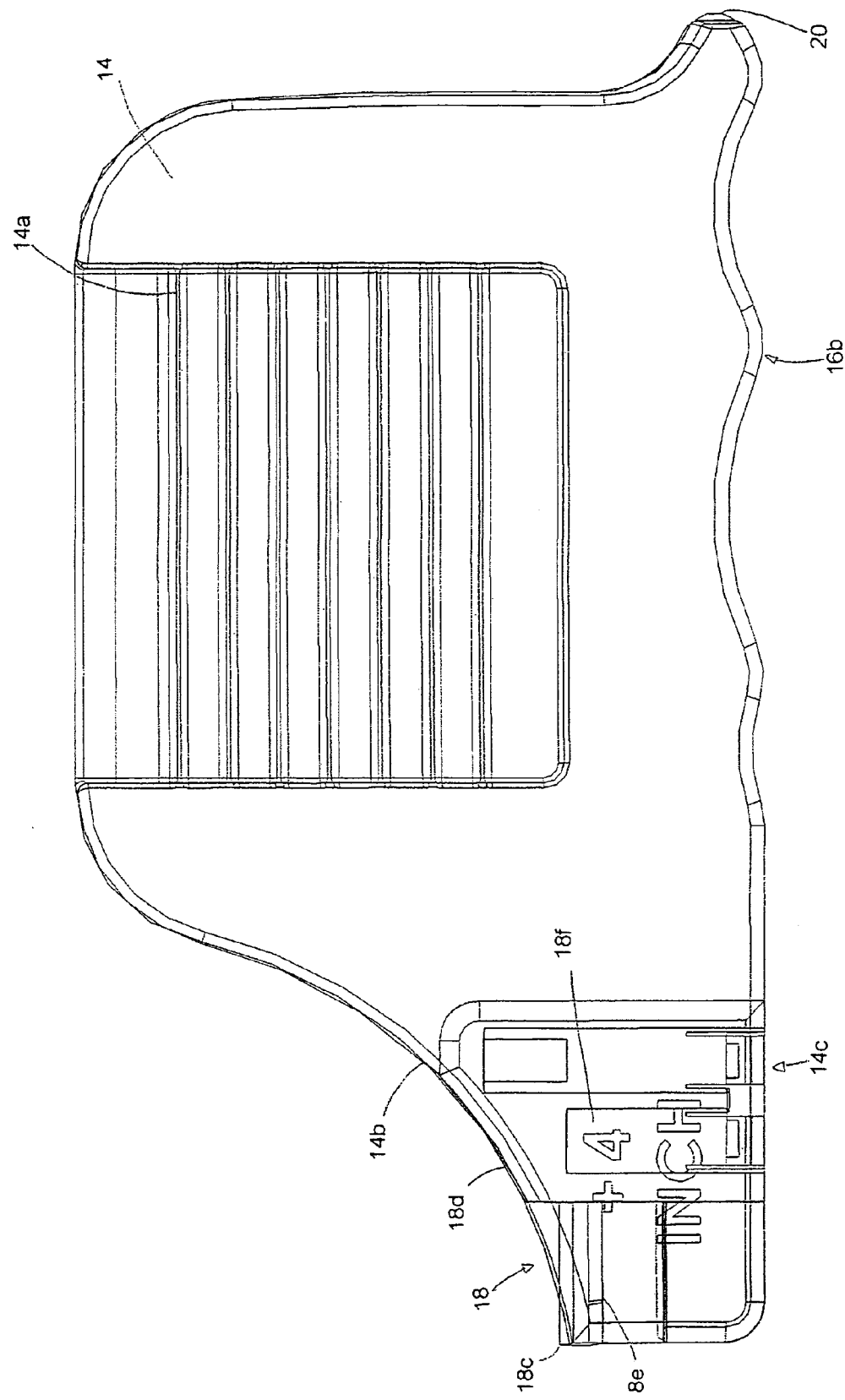
FIG. 11 is, in right side elevation view, the tape measure carrier of FIG. 6.

In keeping with the object that the tape measure carrier according to the present invention is adapted to releasably mount onto many different sizes of conventional coiled metal tape measures 10, tape measure carrier 12 has only one side wall onto which tape measures 10 are clipped.

In particular, side wall 14 forms a lateral boundary of tape measure carrier 12. The clip side 10a of conventional tape measure 10 seats against side wall 14. A spring clip 10d is mounted to side 10a and conventionally projects downwardly from which it is mounted. The base 10b of tape measure 10 preferably sits adjacent or onto base flange 16b of tape measure carrier 12 depending on the size of the tape measure housing, the location of clip 10d and the height of sidewall 14. Rear wall 10c of tape measure 10 seats back against rear wall 16 of tape measure carrier 12 by the positioning of clip 10d along sidewall 14. Preferably the tape 10e runs horizontally through the channel 18a in lens piece 18.

With tape measure 10 so seated in tape carrier 12, and in particular, with clip 10d clipped over and down onto side wall 14 so as to frictionally engage clip 10d slidingly over a parallel array of horizontally aligned corrugations 14a, (which may also be striations, grooves or the like so long as the frictional engagement of clip 10d onto side wall 14 is enhanced), measuring tape 10e is aligned horizontally with channel 18a so as to be loosely seated in channel 18a when extended from tape measure 10 in direction A.

In one embodiment which is not intended to be limiting, lens piece 18 is removably mounted onto the leading end 14b of side wall 14 for example by means of vertically aligned dove-tail slots 18b slidably mounting onto correspondingly sized male dove-tail members 14c formed as for example a pair of members 14c in parallel on the laterally outer most surface of leading end 14b of side wall 14.

Thus different lens pieces 18 may be interchanged for the reasons set out below, by sliding lens piece 18 vertically upwardly in direction B so as to disengage dove-tail slots 18b from dove-tail members 14c, thereby allowing the interchange of the different lens pieces 18.

Each lens piece 18 includes a laterally cantilevered lens 18c mounted at its basal end to side wall 18d in which are formed dove-tail slots 18b. The lens is a transparent window piece. A user looking downwardly in direction C through lens 18c optically aligns laterally extending cross hair 18e on lens 18c with an indicia 10f directly aligned below cross hair 18e. Thus the user knows accurately the distance $d_1$ between the distal end of tape 10e and cross hair 18e.

For an internal measurement the user adds distance $d_1$ to the pre-determined distance $d_2$ indicated by the numerical value of indicator 18f on the exterior surface of side-wall 18d. For example, where the user desires to measure in inches, the particular lens piece 18 for use in inches is mounted onto male dove-tail members 14c. That particular lens piece 18 has the cross hair 18e located so that the pre-determined distance $d_2$ is a round number of inches, for example five inches. Thus a user may easily then add distance $d_1$ to the pre-determined distance of five inches to know the total internal dimension being measured between the distal end of tape 10e and the rear stop 22. A second, metric lens piece 18 may for example have the cross hair 18e on lens 18c set so that the pre-determined distance $d_2$ is for example one hundred millimetres, again, for ease of the user adding the pre-determined distance $d_2$ to the measured distance $d_1$ when the user is measuring using metric indicia 10f.

Channel 18a is formed between the substantially parallel opposed facing surfaces of, respectively, the underside of lens 18c and the upper planar surface of the shelf adjacent forward stop 16c. Lens 18c and forward stop 16c are vertically spaced apart by a small distance, between, and not intending to be limiting for example one eighth to one quarter inch.

Forward stop 16c has a forward-most edge which is perpendicular to the tape 10e. Thus forward stop 16c may be used for external distance measurements. In use the user abuts forward stop against the edge to be externally measured to, that is, so that the edge to be measured to is underneath tape 10e, and the user then reads the tape measurement indicia 10f which aligns with the forward edge of forward stop 16c. The forward edge of forward stop 16c is indicated by indicating arrow 16d for ease of reference by the user.

In one embodiment, a small resilient rear stop 22, for example formed as a portion of a hemisphere, is mounted in the vertical plane D which laterally bisects rear wall 16a. An indicating arrow 22a may be provided on rear wall 16a to indicate to a user the alignment point of rear stop 22. Stop 22 allows for the precise positioning of tape measure carrier 12 against a surface to which the tape measure carrier is to be abutted when for example making an internal measurement between stop 22 and the distal end of tape 10e. In one embodiment the rear stop may be adjusted relative to carrier 12, for example by means of a threaded mounting into carrier 12, so as to be finely adjustable to account for variations in the size of the housings of various tape measures.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A tape measure carrier and gauge for supporting a coiled metal tape style of tape measure, a semi-enclosed housing having:
   (a) a substantially planar side wall having a thickness, wherein said side wall has a front end, an opposite rear end and opposite upper and lower edges,
   (b) a base flange joined along one edge thereof to, and extending orthogonally from, said lower edge of said side wall, wherein said base flange extends from adjacent said front end to adjacent said rear end of said sidewall,
   (c) a rear wall connected to at least one of said rear end of said side wall or said base flange, said rear wall extending substantially orthogonally from both said sidewall and said base flange, and wherein a rear stop is formed in the corner between said base flange and said rear wall,
   (d) an adjustment means incorporated into said rear stop, wherein the longitudinal position of said rear stop may be adjusted inwards or outwards,
   (e) a shelf connected to at least one of said front end of said sidewall or said base flange, said shelf extending substantially orthogonally from said sidewall and wherein said shelf is substantially horizontal,
a lens piece having a clear lens and a mounting base, wherein mounting base is adapted to be releasably mounted to said front end of said sidewall wherein said lens is mounted cantilevered from said mounting base so as to be disposed in substantially parallel spaced-apart array over said shelf when said lens piece is mounted on said front end of said sidewall, said lens having a cross-hair formed therealong so as to extend along said lens orthogonally from said sidewall,
and wherein said thickness of said sidewall is sufficient for the clip to mount on said sidewall of said tape measure carrier to frictionally engage over and down along said sidewall as the tape measure is translated downwardly to releasably matingly engage the clip onto said sidewall,
and wherein said semi-enclosed housing is sized so that the tape measure at least partially fills said semi-enclosed housing when mated thereon without the tape measure having to necessarily seat against said rear wall, whereby a variety of sizes of the tape measure are accommodated within said carrier,
and wherein a pre-determined known distance is formed from said rear stop to said cross-hair, whereby a measured distance measured along the tape measure tape between said cross hair and the distal end of the tape is summed with said known distance to provide a total measurement from said rear stop to the distal end of the tape,
and wherein said known distance from said rear stop to said cross-hair is an integer unit number of length units whereby calculation of said total measurement from said rear stop to the distal end of the tape is simplified,
and wherein the longitudinal position of said rear stop may be adjusted inwards or outwards by use of said adjustment means incorporated into said rear stop, and wherein said known distance from said rear stop to said crosshair may be fractionally adjusted shorter or longer, whereby said known distance may be calibrated to an exact benchmark of said known distance, or be adjusted to compensate for, and accommodate a variety of individual tape measures having varying degrees of accuracy.

2. The apparatus of claim 1 wherein said mounting base is adapted to releasably mount downwardly onto an exterior surface of said front end of said sidewall, wherein said exterior surface is oppositely disposed on said sidewall relative to said base flange, and wherein said exterior surface of said front end of sidewall incorporates a slot to accommodate said base flange mounted downwardly, and wherein said base flange frictionally engages in said slot, and wherein said base flange is height position adjustable, whereby position of said mounting base may be adjusted, set and optimized for viewing the indicia on a variety of different sizes of measuring tapes.

3. The apparatus of claim 2 wherein said lens piece can be an "inches" known distance lens piece or a "centimeter" known distance lens piece, and wherein said inches lens piece and said centimeter lens piece include an indication of said known distance, and wherein on said "inches" lens piece said known distance is an integer unit number of inches and said cross-hair is positioned on said lens, and said lens positioned on said mounting base to provide said known integer number of inches from said rear stop to said cross hair, and wherein on said "centimeter" known distance lens piece said known distance is an integer unit number of centimeters and said cross-hair is positioned on said lens, and said lens positioned on said mounting base to provide said known integer number of centimeters from said rear stop to said cross-hair.

4. The apparatus of claim 3 wherein said carrier sidewall is substantially perpendicular to said lens cross-hair whereby said carrier sidewall helps indicate the orientation of said carrier relative to the direction of measurement, and wherein said carrier sidewall incorporates an inset and ribbed section whereby frictional engagement of the dip from the tape measure translated downwardly to releasably matingly engage onto said sidewall is enhanced.

* * * * *